US009541660B2

(12) United States Patent
De Cacqueray et al.

(10) Patent No.: US 9,541,660 B2
(45) Date of Patent: Jan. 10, 2017

(54) SYSTEM AND METHOD FOR THREE-DIMENSIONAL ITERATIVE FILTERING OF SCATTERED WAVES IN CROSS SPREAD SEISMIC SYSTEMS

(71) Applicant: CGG SERVICES SA, Massy (FR)

(72) Inventors: Benoit De Cacqueray, Clamart (FR); Philippe Roux, Grenoble (FR)

(73) Assignee: CGG SERVICES SA, Massy (FR)

( * ) Notice: Subject to any disclaimer, the term of this patent is extended or adjusted under 35 U.S.C. 154(b) by 615 days.

(21) Appl. No.: 14/040,868

(22) Filed: Sep. 30, 2013

(65) Prior Publication Data
US 2014/0095079 A1 Apr. 3, 2014

Related U.S. Application Data

(60) Provisional application No. 61/708,230, filed on Oct. 1, 2012.

(51) Int. Cl.
 G01V 1/36 (2006.01)
(52) U.S. Cl.
 CPC ....... *G01V 1/364* (2013.01); *G01V 2210/1425* (2013.01); *G01V 2210/242* (2013.01)
(58) Field of Classification Search
 CPC .................................................. G01V 1/364
 USPC .......................................................... 702/17
 See application file for complete search history.

(56) References Cited

U.S. PATENT DOCUMENTS

| 8,965,706 B2 * | 2/2015 | Ji | G01V 1/364 |
| | | | 181/112 |
| 2014/0316709 A1 * | 10/2014 | Ji | G01V 1/364 |
| | | | 702/17 |

OTHER PUBLICATIONS

X. Campman, et al., "Suppressing Near-Receiver Scattered Waves from Seismic Land Data", Geophysics, Jul.-Aug. 2006, pp. S121-S128, vol. 71, No. 4.
D. Le Meur, et al., "Adaptive Noise Attenuation", SEG Las Vegas 2008 Annual Meeting, Nov. 9-14, 2008, pp. 3667-3670.
J. Meunier, et al., "3D Geometry, Velocity, Filtering and Scattered Noise", SEG, 1999, Expanded Abstracts, pp. 1216-1219.
M. Stenlund, et al., "Dispersing Billiards with Moving Scatterers", Communications in Mathematical Physics, Sep. 2013, 322, pp. 909-955.
G. Vermeer, "Alternative Strategies for Tackling Scattered Noise", SEG Las Vegas 2008 Annual Meeting, Nov. 9-14, 2008, pp. 95-99.

* cited by examiner

*Primary Examiner* — Bryan Bui
(74) *Attorney, Agent, or Firm* — Patent Portfolio Builders PLLC

(57) ABSTRACT

A system and method are provided for filtering scatterer noise energy from land seismic waves using three dimensional (3D) iterative filtering in a cross-spread source-receiver pattern. The system and method isolate scatterer noise energy associated with a scatterer based on a filtering process performed using a scatterer referential time delay. Then, the isolated scatterer noise energy can be subtracted from the surface wave data. This process can be repeated for each scatterer in the covered area to remove each of their contributions, and can be performed, for example, after a preliminary filtering of the surface wave data using 3D fk filtering or the like.

18 Claims, 13 Drawing Sheets

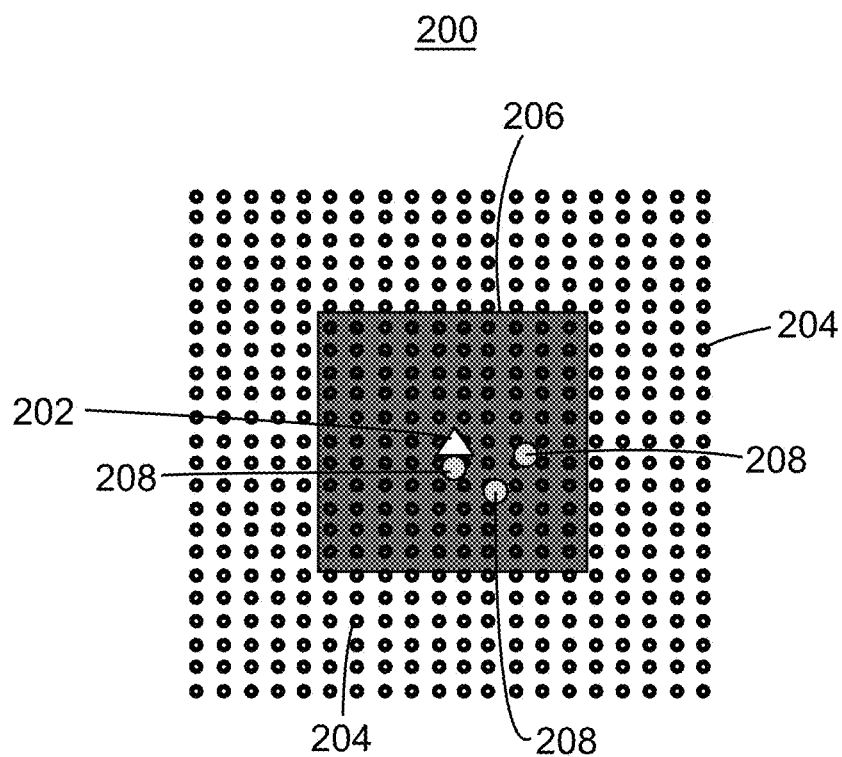

Full 3D

Cross-Spread

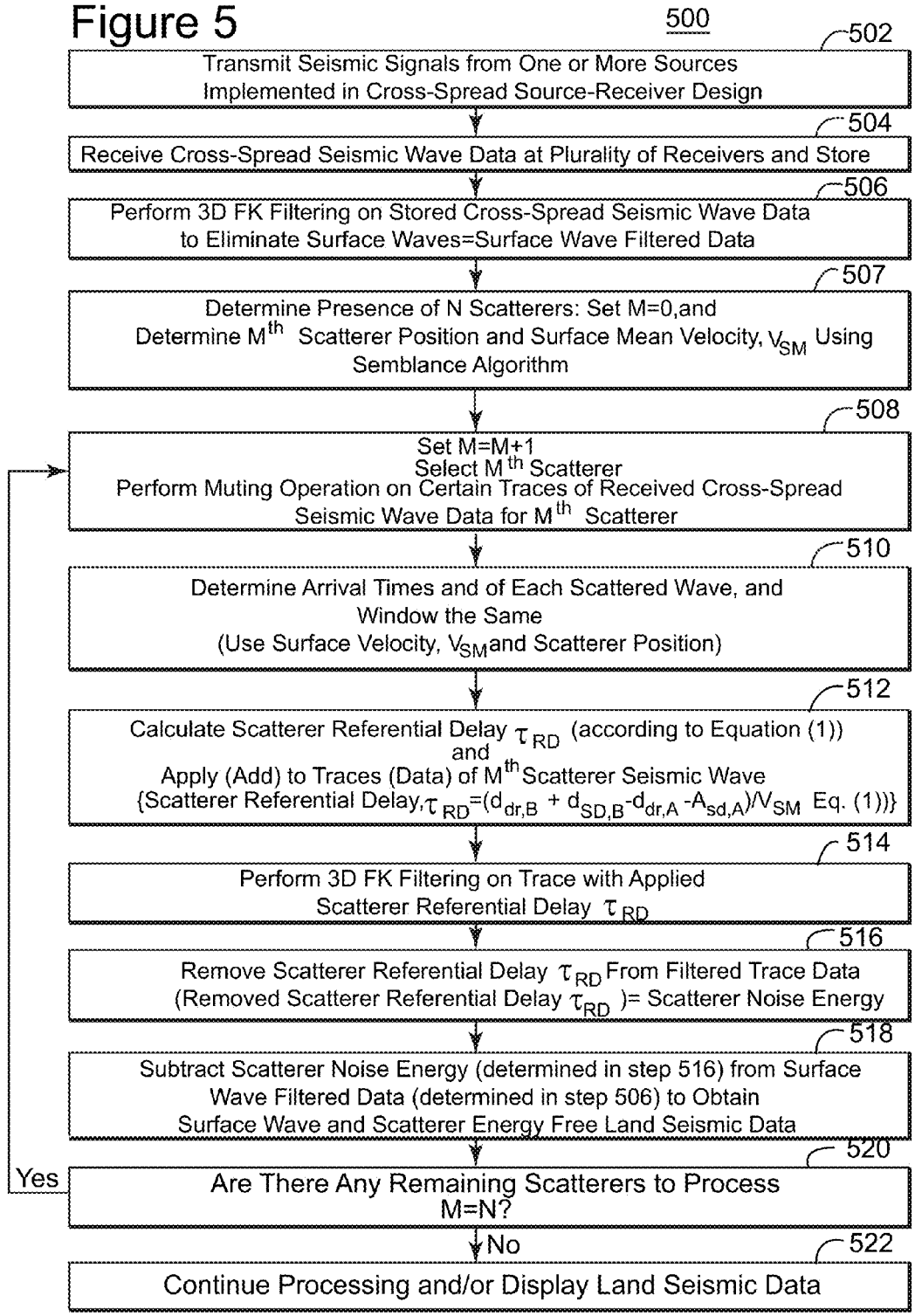

502 — Transmit Seismic Signals from One or More Sources Implemented in Cross-Spread Source-Receiver Design

504 — Receive Cross-Spread Seismic Wave Data at Plurality of Receivers and Store

506 — Perform 3D FK Filtering on Stored Cross-Spread Seismic Wave Data to Eliminate Surface Waves=Surface Wave Filtered Data

507 — Determine Presence of N Scatterers: Set M=0, and Determine $M^{th}$ Scatterer Position and Surface Mean Velocity, $V_{SM}$ Using Semblance Algorithm

508 — Set M=M+1
Select $M^{th}$ Scatterer
Perform Muting Operation on Certain Traces of Received Cross-Spread Seismic Wave Data for $M^{th}$ Scatterer

510 — Determine Arrival Times and of Each Scattered Wave, and Window the Same (Use Surface Velocity, $V_{SM}$ and Scatterer Position)

512 — Calculate Scatterer Referential Delay $\tau_{RD}$ (according to Equation (1)) and Apply (Add) to Traces (Data) of $M^{th}$ Scatterer Seismic Wave {Scatterer Referential Delay, $\tau_{RD} = (d_{dr,B} + d_{SD,B} - d_{dr,A} - A_{sd,A})/V_{SM}$ Eq. (1)}

514 — Perform 3D FK Filtering on Trace with Applied Scatterer Referential Delay $\tau_{RD}$

516 — Remove Scatterer Referential Delay $\tau_{RD}$ From Filtered Trace Data (Removed Scatterer Referential Delay $\tau_{RD}$)= Scatterer Noise Energy

518 — Subtract Scatterer Noise Energy (determined in step 516) from Surface Wave Filtered Data (determined in step 506) to Obtain Surface Wave and Scatterer Energy Free Land Seismic Data

520 — Are There Any Remaining Scatterers to Process M=N? — Yes (loop back)

522 — No → Continue Processing and/or Display Land Seismic Data

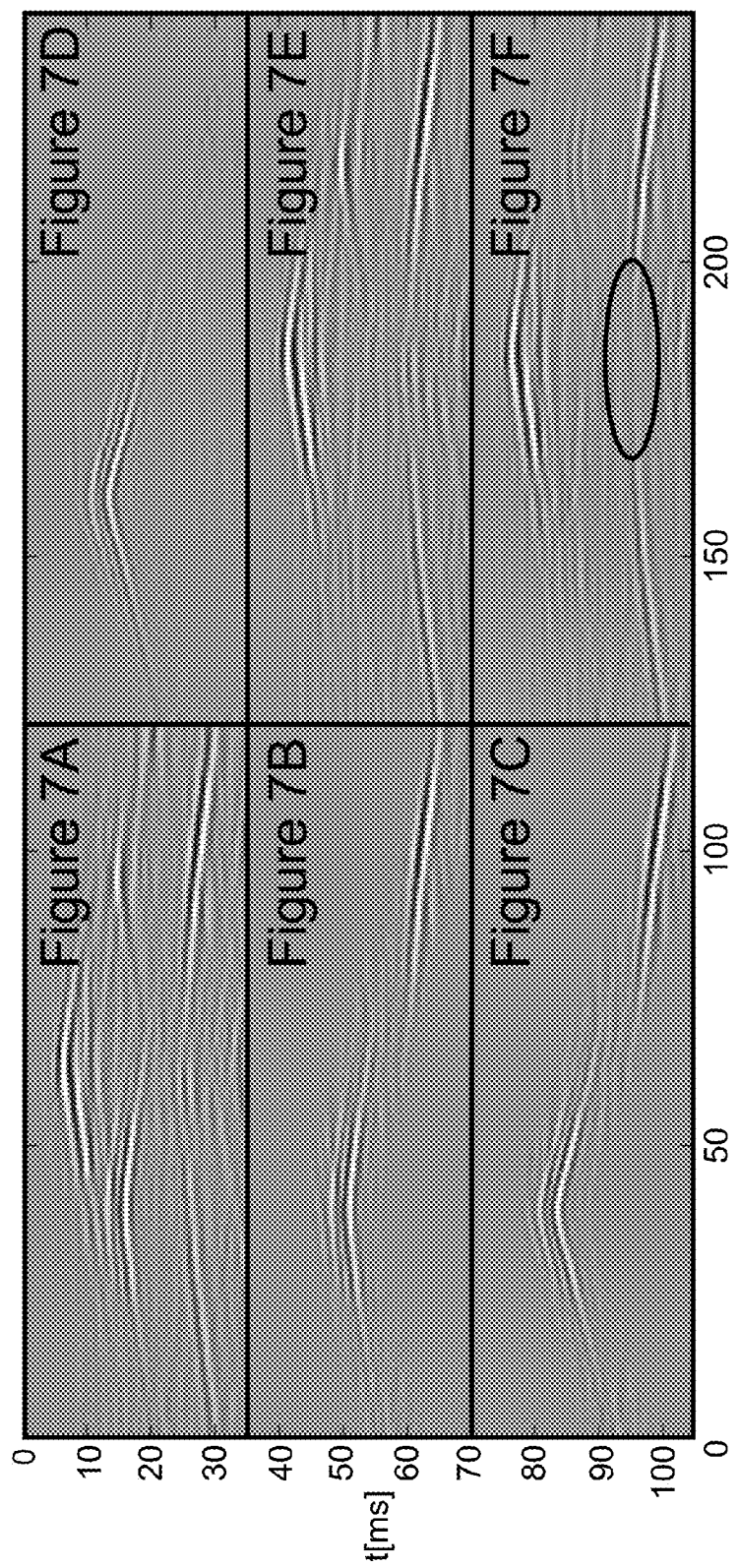

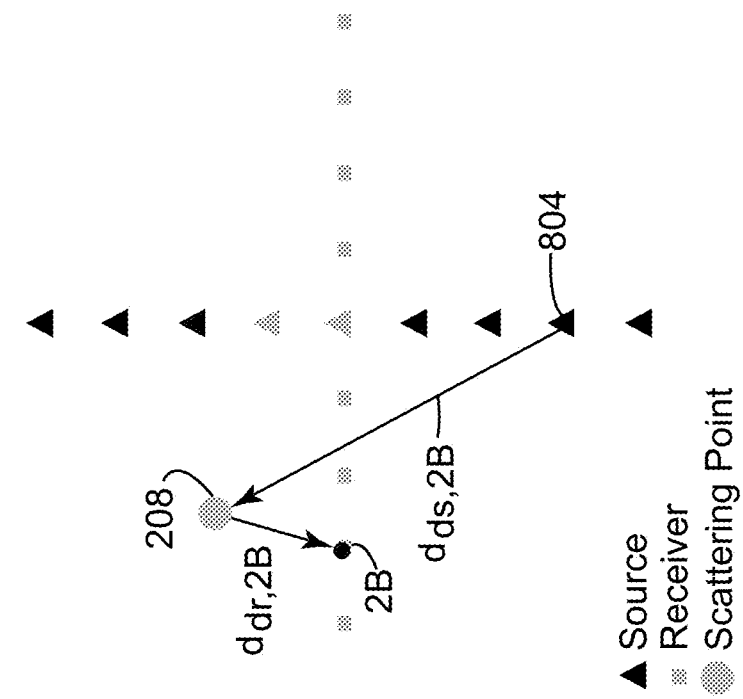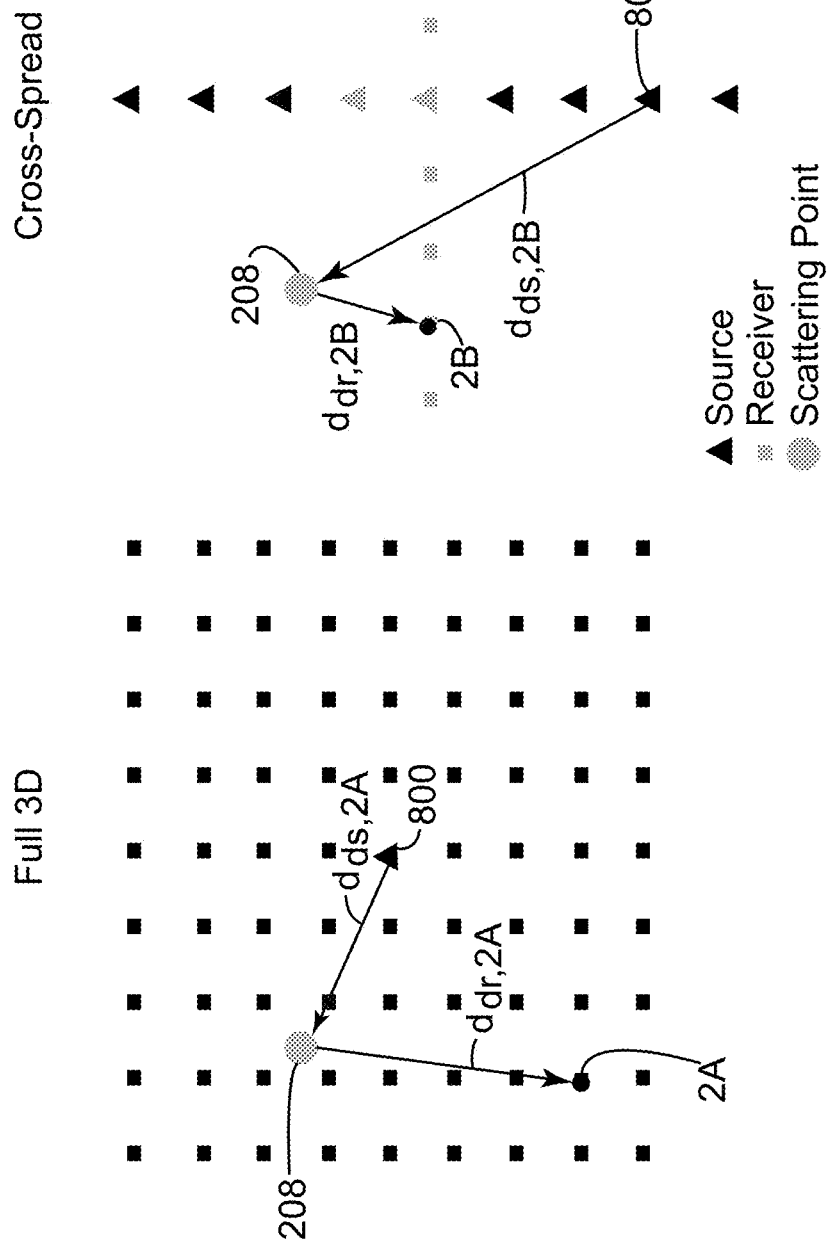
Figure 8B Cross-Spread
Figure 8A Full 3D

SYSTEM AND METHOD FOR THREE-DIMENSIONAL ITERATIVE FILTERING OF SCATTERED WAVES IN CROSS SPREAD SEISMIC SYSTEMS

PRIORITY INFORMATION

The present application claims priority under 35 U.S.C. §119(e) to U.S. Provisional Patent Application Ser. No. 61/708,230, filed Oct. 1, 2012, the entire contents of which are expressly incorporated herein by reference.

TECHNICAL FIELD

The present embodiments relate generally to data analysis of land-based seismic data acquisition systems, and, more particularly, to systems and methods for filtering scattered surface waves using in land-based seismic data acquisition systems using a cross spread design.

BACKGROUND

Seismic waves generated artificially have been used for more than 50 years to perform imaging of geological layers. During seismic exploration operations, vibrator equipment (also known as a "source") generates a seismic signal that propagates in the form of a wave that is reflected at interfaces of geological layers. These reflected waves are received by geophones, or more generally receivers, which convert the displacement of the ground resulting from the propagation of the waves into an electrical signal which is recorded. Analysis of the arrival times and amplitudes of these waves make it possible to construct a representation of the geological layers on which the waves are reflected.

FIG. 1 depicts schematically a system 100 for transmitting and receiving seismic waves intended for seismic exploration in a land environment. The system 100 comprises a source 102 consisting of a vibrator operable to generate a seismic signal, a set of receivers 104 (e.g., geophones) for receiving a seismic signal and converting it into an electrical signal and a seismic data acquisition recorder system (recorder system) 106 for recording the electrical signals generated by the receivers 104. The source 102, the receivers 104 and the recorder system 106 are positioned on the surface of the ground 108. FIG. 1 depicts source 102 as a single vibrator but it should be understood that the source may be composed of several vibrators, as is well known to persons skilled in the art. System 100 further includes vehicle 122a, for housing the source 102, and vehicle 122b for housing recorder system 106, as well as antennas 124 for communications between vehicles 122a,b (and source 102) and receivers 104. The receivers 104 are interconnected by cables 126 and connected to recorder system 106. Antennas 124 on receivers 104 can communicate data from receivers 104 to recorder system 106, as can cables 126. Furthermore, in operation, vehicle 122a is generally not static, but generates transmitted waves in different locations for the GAI.

In operation, source 102 is operated so as to generate a seismic signal. This signal propagates firstly on the surface of the ground, in the form of surface waves 110, and secondly in the subsoil, in the form of transmitted waves 112 that generate reflected waves 114 when they reach an interface 115 between two geological layers. Each receiver 104 receives both a surface wave 110 and a reflected wave 114 and converts them into an electrical signal, which signal thus includes a component associated with the reflected wave 114 and another component associated with the surface wave 110. Since system 100 intends to image the subsurface regions 116 and 118, including a hydrocarbon deposit 120, the component in the electrical signal associated with the surface wave 110 is undesirable and should be filtered out.

In addition to "straight" surface waves 110, i.e., those that proceed more or less linearly from source 102 to receivers 104, there are other surface wave types that also present problems associated with generating an accurate image of the desired subsurface strata. For example, so-called scattered waves are surface waves that reflect off of objects or boundaries in or around the surface. Scattering is caused by, for example, large underground rocks, mineral seams, and other objects of that nature, collectively referred to here as "scatterers". A scatterer, therefore, acts like another point source or generator of seismic energy, but one which was not intended to be used to image the subsurface. In the presence of scatterers, therefore, 3D frequency-wavenumber (fk) filtering, also referred to as fan filtering, can be a useful tool to filter out scattered waves if a so-called a full three dimensional (3D) source-receiver pattern is used, hereafter referred to as "Full 3D".

FIG. 2A illustrates an example of a Full 3D source-receiver pattern 200 from a top view perspective. Therein, a single source 202 is disposed at the center of a field of receivers 204 (only a few of which are numbered to avoid obscuring the drawing). When the single source 202 generates a seismic signal (shoots the area), reflected wave energy will be received by the receivers 204 within the covered area 206. The receivers 204 will also receive surface waves from three exemplary scatterers 208. As mentioned above, these scattered waves can be removed by using 3D fk filtering. However, it has been determined that a significant part of the scattered wave energy cannot be filtered out using 3D fk filtering techniques in seismic exploration systems which use a cross-spread source-receiver pattern instead of a Full 3D design (see, for example, "3D geometry, Velocity Filtering and Scattered Noise," Meunier J., 69th Annual International Meeting, SEG, Expanded Abstracts, 1216-1219 [1999]).

To better understand why this is so, compare the Full 3D source-receiver pattern (Full 3D pattern) 200 with a cross spread pattern source-receiver (cross spread pattern) 300 illustrated in FIG. 3A which is intended to cover the same area 206. Instead of using one source or shotpoint 202 and a large number of receivers 204 as in the Full 3D pattern 200, the cross spread pattern 300 uses more shotpoints 302 and fewer receivers 304 arranged in an intersecting, cross pattern. It will be appreciated by those skilled in the art that, in some cases, it may be more cost effective to deploy a seismic acquisition system using the cross spread pattern 300 rather than the Full 3D pattern 200, since the cross spread pattern requires the deployment of many fewer receivers. The same three scatterers 208 are also present in this area 206 such that the comparison of the scatterer effects for both Full 3D pattern 200 and cross spread pattern 300, discussed below, is meaningful.

In order to compare received signal energy by the different source-receiver patterns 200 and 300, consider a Full 3D design and a cross spread design having the same covered area 206 and which also generate the same number of seismic traces. For example, suppose that the Full 3D source-receiver pattern 200 includes a single source 202 and 9801 receivers 204 for a total of 9801 traces, i.e., 1×9801. Similarly, suppose that the cross spread source receiver pattern 300 includes 81 sources 302 and 121 receivers 304, which will also generate 9801 traces (i.e., 121×81). While these source-receiver patterns cover the same area, and generate the same number of seismic traces, it will be seen below that the signal energy received for comparable traces will be different due to the difference in the source-receiver patterns.

More specifically, compare the time slice of a seismic trace illustrated in FIG. 2B for the Full 3D system 200 with the time slice illustrated in FIG. 3B of a comparable seismic trace for the cross spread system 300, which seismic traces have been generated using synthetic data. In this context, "comparable" seismic traces refer to traces from each system which image the same point in the subsurface, i.e., the common midpoint (CMP). Each time slice shows four energy arrival patterns, one (210 and 310) associated with the primary reflected wave from the source and three associated with scattered waves 212, 214, 216 and 312, 314, 316 generated by the three scatterers 208. It can be observed that the largest patterns 210 and 310, which correspond to the primary wave arrival, have the same circular pattern for both source-receiver patterns 200 and 300's time slices.

However while the three scatterer patterns 212, 214 and 216 in the time slice associated with the Full 3D pattern 200 are also substantially circular, this is not the case for the three scatterer patterns 312, 314 and 316 associated with the time slice for the cross spread pattern 300, which are substantially less circular. The above-referenced article by Meunier shows that this pattern modification of the scattered waves, i.e., the "non-circularity", decreases the 3D fk filtering efficiency for the scattered waves.

Accordingly, it would be desirable to provide methods, modes and systems for filtering scattered surface waves, which otherwise obscure useful data, when using a cross spread design in land-based seismic data acquisition.

SUMMARY

It is therefore a general aspect of the embodiments to provide methods, modes and systems for filtering scattered surface waves which hide useful data in systems using a cross spread design as a basis for land-based seismic data acquisition that will obviate or minimize one or more of the problems previously described.

According to a first aspect of an embodiment, a method is provided for filtering scatterer noise energy from land seismic waves in a cross-spread source-receiver pattern, the method comprising recording waves received at receivers disposed relative to a shot pattern in a cross-spread source receiver pattern, filtering surface waves from the recorded waves to produce surface wave filtered data, determining a plurality of scatterers associated with the recorded waves, selecting a scatterer from the plurality of scatterers, isolating scatterer noise energy generated by the scatterer by filtering the surface wave filtered data using a scatterer referential time delay associated with the scatterer, wherein the scatterer referential time delay is calculated as $$\tau_{RD} = (d_{dr,2B} + d_{sd,2B} - d_{dr,2A} - d_{sd,2A})/v_{SM},$$

wherein $d_{dr,B}$ is a first distance from said selected scatterer to a first selected receiver, $d_{sd,B}$ is a second distance from said selected scatterer to a first selected source, $d_{dr,A}$ is a third distance from said selected scatter to a second selected receiver, and $d_{sd,A}$ is a fourth distance from said selected scatterer to a second selected source, subtracting said scatterer noise energy from said surface wave filtered data, and repeating each of the steps of selecting, isolating and subtracting for each of the plurality of scatterers.

According to a second aspect of an embodiment, a method is provided for filtering scatterer noise energy from land seismic waves, the method comprising filtering surface waves from acquired land seismic data to produce surface wave filtered data, selecting a scatterer from a plurality of scatterers, isolating scatterer noise energy from the scatterer based on a filtering in a scatterer referential time delay, subtracting said scatterer noise energy from said surface wave filtered, and repeating each of the steps of selecting, isolating and subtracting for each of the plurality of scatterers.

According to a third aspect of an embodiment, a method is provided for filtering scatterer noise energy from seismic waves, the method comprising selecting a scatterer from a plurality of scatterers, determining scatterer noise energy generated by the scatterer in seismic data, and subtracting said scatterer noise energy from the seismic data set.

BRIEF DESCRIPTION OF THE DRAWINGS

The above and other objects and features of the embodiments will become apparent and more readily appreciated from the following description of the embodiments with reference to the following figures, wherein like reference numerals refer to like parts throughout the various figures unless otherwise specified, and wherein:

FIG. 2A illustrates a Full 3D source-receiver design for the use in obtaining land-based seismic information for a geographical area of interest (GAI);

FIG. 5 illustrates a flow chart of a method for filtering received data when using a cross spread source-receiver design for the acquisition of land based seismic data according to an embodiment;

FIGS. 7A-F illustrate six different steps of processing of surface wave data according to an embodiment;

FIGS. 8A and 8B illustrate a scattered waves path difference for two source-receiver pairs imaging the same point at depth in both Full 3D and cross spread design associated with a given scatterer according to an embodiment;

DETAILED DESCRIPTION

Figure 1:
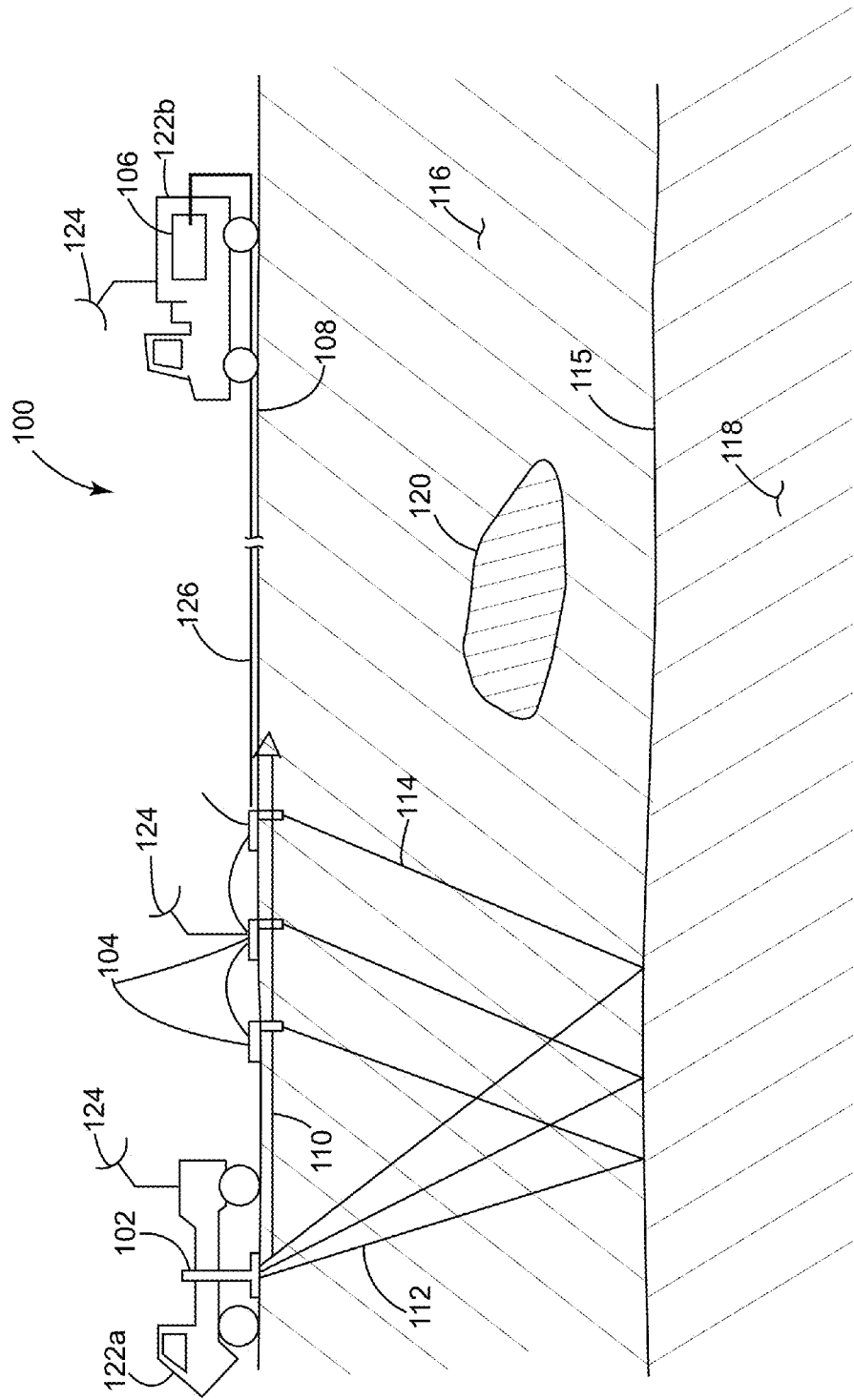
FIG. 1 depicts schematically a device for transmitting and receiving seismic waves intended for seismic exploration in a land environment.

The concepts associated with these embodiments are described more fully hereinafter with reference to the accompanying drawings, in which embodiments are shown. In the drawings, the size and relative sizes of layers and regions may be exaggerated for clarity. Like numbers refer to like elements throughout. These concepts may, however, be embodied in many different forms and should not be construed as limited to the embodiments set forth herein. Rather, these embodiments are provided so that this disclosure will be complete, and will convey the scope of these concepts to those skilled in the art. The scope of the embodiments is therefore defined by the appended claims. The following embodiments are discussed, for simplicity, with regard to a method for filtering received data when using a cross spread source-receiver design for the acquisition of land based seismic data.

However, the embodiments to be discussed next are not limited to a land based seismic acquisition, but may be applied to other systems, e.g., those that conventionally involved 3D fk filtering of acquired seismic data. Reference throughout the specification to "one embodiment" or "an embodiment" means that a particular feature, structure, or characteristic described in connection with an embodiment is included in at least one embodiment of the present embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

According to embodiments, the problems described above can be addressed by, for example, isolating scatterer noise energy in seismic data which is associated with a scatterer based on a filtering process performed using a scatterer referential time delay. Then, the isolated scatterer noise energy can be subtracted from the surface wave data. This process can be repeated for each scatterer in the covered area to remove each of their contributions, and can be performed, for example, after a preliminary filtering of the surface wave data using 3D fk filtering or the like.

Figure 4:
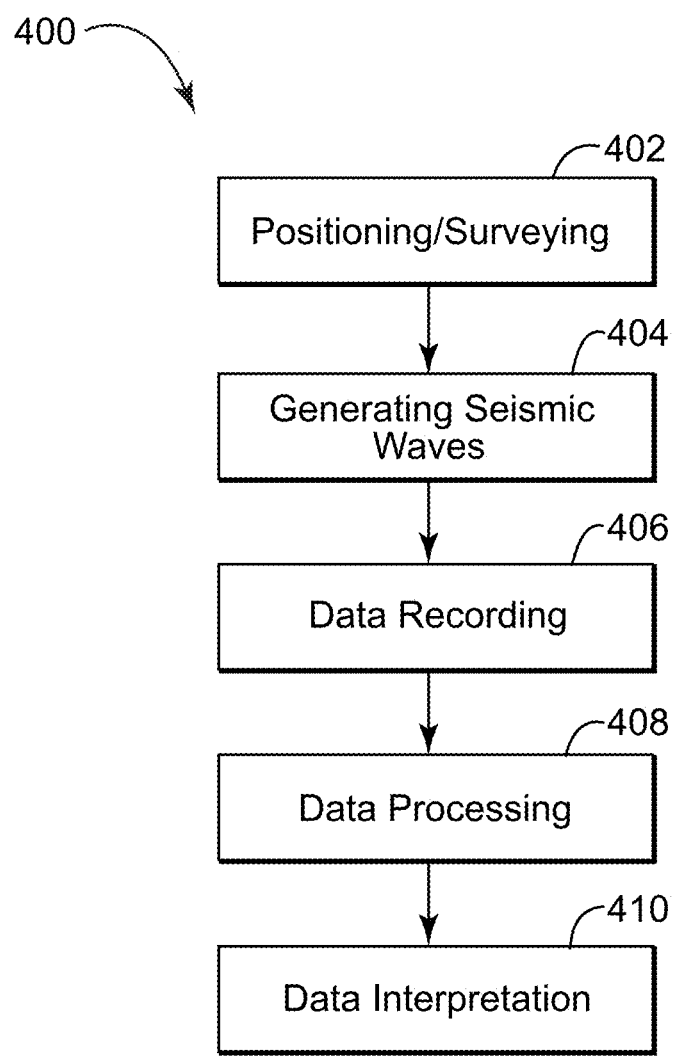
FIG. 4 illustrates a general method for seismic exploration according to an embodiment

Prior to discussing such filtering embodiments in more detail, it may be useful to consider the overall seismic exploration process in general for context. As generally discussed above, one purpose of seismic exploration is to render the most accurate graphical representation possible of specific portions of the Earth's subsurface geologic structure, e.g., using the seismic data which is collected as described above with respect to FIG. 1. The images produced allow exploration companies to accurately and cost-effectively evaluate a promising target (prospect) for its oil and gas yielding potential (e.g., hydrocarbon deposits 120). FIG. 4 illustrates a generalized method for seismic exploration which includes both the acquisition of the seismic data described above, and the subsequent processing of that seismic data to form such images.

In FIG. 4, the overall process is broken down into five steps, although one could of course characterize seismic exploration in a number of different ways. Step 402 references the initial positioning of the survey equipment in the geographic area of interest (GAI) and the preparation to begin surveying the GAI in a manner which is precise and repeatable. Seismic waves are generated by the afore-described sources or vibrators (step 404), and data recording is performed on the reflected, scattered and surface waves by the receivers (step 406). In step 408, processing of the raw, recorded seismic data occurs. Data processing generally involves numerous processes intended to, for example, remove noise and unwanted reflections from the recorded data and involves a significant amount of computer processing resources, including the storage of vast amounts of data, and multiple processors or computers running in parallel. In particular, for the embodiments discussed below, such processing includes filtering to remove scattered waves. Such data processing can be performed on site, back at a data processing center, or some combination thereof. Finally, in step 410, data interpretation occurs and the results can be displayed or generated as printed images, sometimes in two-dimensional form, more often now in three dimensional form. Four dimensional data presentations (i.e., a sequence of 3D plots or graphs over time) are also possible outputs, when needed to track the effects of, for example, extraction of hydrocarbons from a previously surveyed deposit.

Figure 3A:
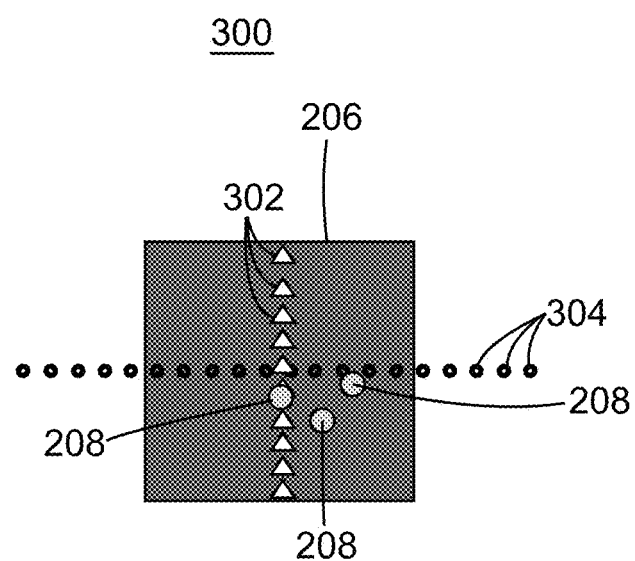
FIG. 3A illustrates a cross spread source-receiver design for the use in obtaining land-based seismic information for a GAI.
Figure 3B:
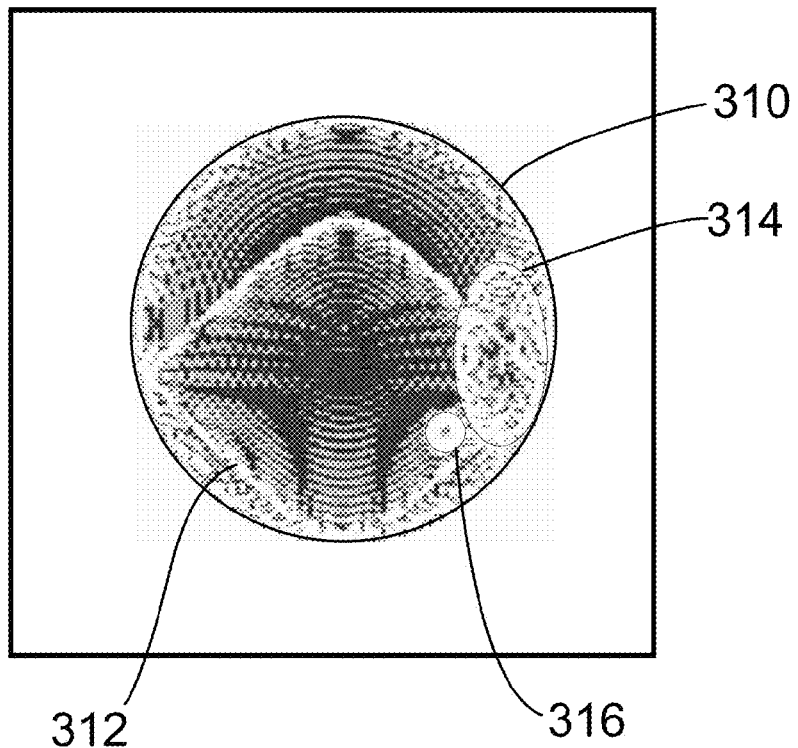
FIG. 3B illustrates a corresponding time-slice of the cross spread source-receiver design when synthetic data is introduced to the receivers.

With this context in mind, FIG. 5 illustrates a flow chart of method 500 for filtering received data when using a cross spread source-receiver design for the acquisition of land based seismic data according to an embodiment. In the method shown in FIG. 5, 3D fk filtering, and/or another classical filtering method(s), is iteratively applied to filter the contribution of each scatterer 208 in a scattered-centered referential-type design. Method 500 begins with step 502 wherein seismic signals are transmitted by each of seismic sources 102 as shown in FIGS. 1 and 3A. In step 504 the data is received and in step 506 it is processed using a classical 3D fk filter (or any other known filtering method or modelisation subtraction method) to filter the data to remove the main portion of the surface waves. Implicit in step 506 is the generation of Full 3D land seismic data for a geographical area of interest (GAI). The processing involved in creating Full 3D land seismic data can be accomplished according to conventional means known to those of ordinary skill in the art.

Figure 6A:
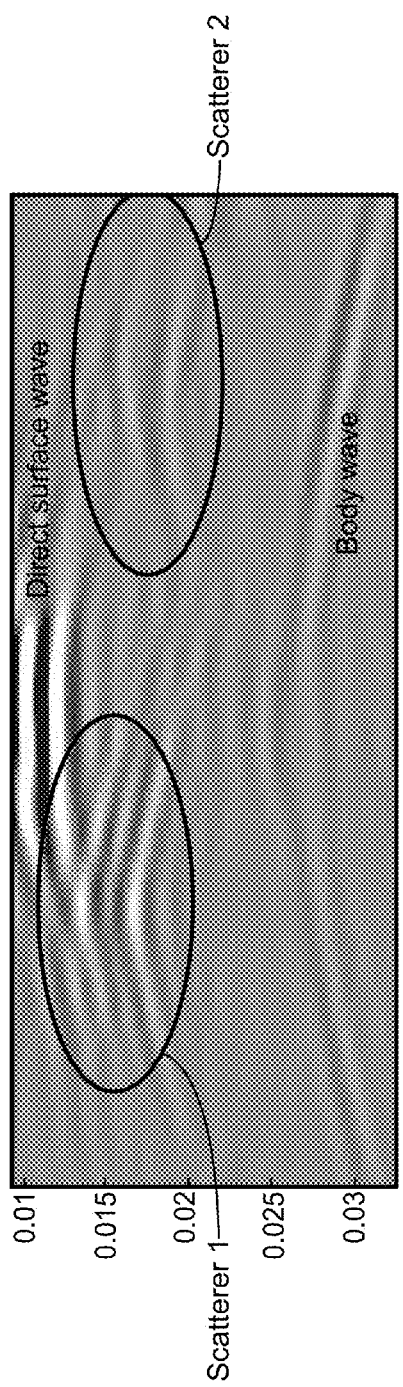
FIGS. 6A and 6B illustrate received and processed data, respectively, using the method for filtering received data when using a cross spread source-receiver design for the acquisition of land based seismic data as shown in FIG. 5 according to an embodiment.
Figure 6B:
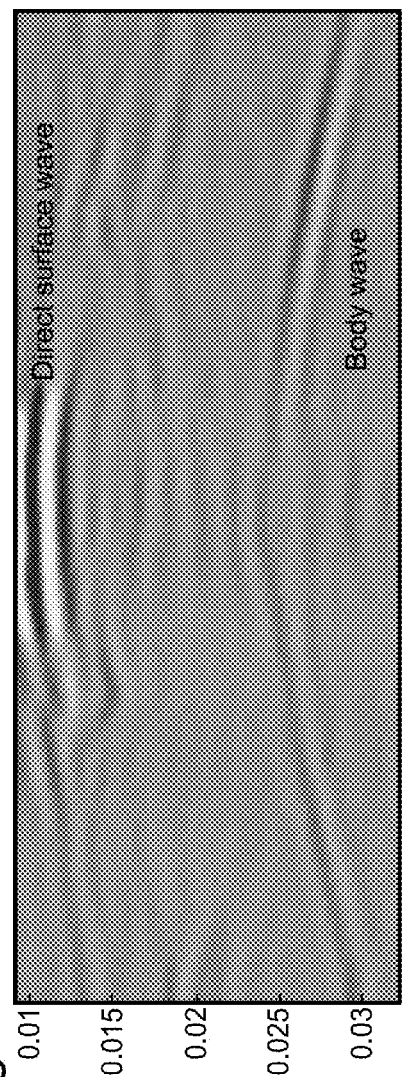

As mentioned in the Background, applying 3D fk filtering with a cross spread source-receiver design is a powerful tool for direct surface wave filtering. It can also be used to filter diffracted waves within the traces that are located far from scatterers 208. FIG. 6A depicts received seismic wave energy after applying 3D fk filtering thereto. However, as the patterns in the ovals in FIG. 6A indicate, some residuals with high energy associated with scattered waves can still be present (i.e., scatterers 1 and 2) after the application of 3D fk filtering. Thus the method of FIG. 5 iteratively filters the data for each identified scatterer to remove such energy from the data, resulting in the processed image shown in FIG. 6B. The benefits of such processing illustrated by FIGS. 6A and 6B are further described below after a presentation of the detailed method.

Thus, according to the embodiment, the data output from step 506 can be referred to as surface wave filtered data, and represents the original data with a first level of filtering performed on it. Step 507 follows step 506, which is included for at least the purposes of representing, in a flow chart form, the iteration that is involved in performing the main part of method 500 for each of the determined scatterers 208. In step 507 a counter M is set equal to zero, and incremented each time a new scatterer is processed according to method 500. Also in step 507 method 500 determines a position or location of scatterer 208 in reference to the source(s) 102 and receiver(s) 104.

Figure 10:
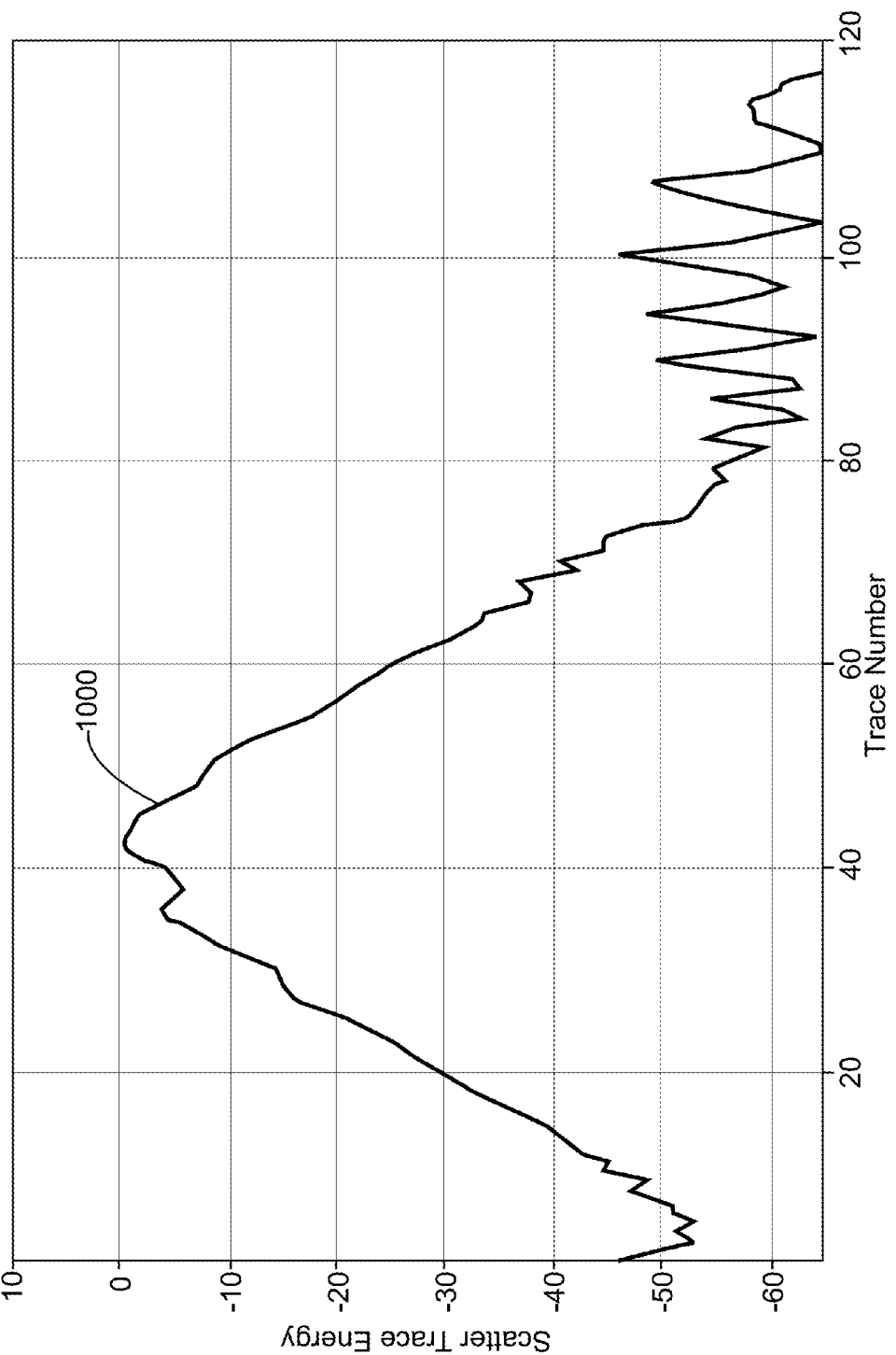
FIG. 10 illustrates trace energy for a given scatterer according to an embodiment.

According to an embodiment, the process of determining approximate locations of the main scatterers 208 is performed using semblance-like algorithms, an example of such processing and determining being shown in FIG. 10 and described below. The use of semblance algorithms can also, according to an embodiment, determine the presence or number of scatterers, and then also their positions through the appropriate use and sized thresholds, the determination of which is known to those of skill in the art. In this same step, step 507, the mean surface wave velocity, $v_{SM}$ of the selected scatterer 208 can also be determined using, according to an embodiment, one of any classical velocity analysis algorithms. For example, according to an embodiment, one such semblance and velocity analysis algorithm is known as a linear velocity scan. The semblance algorithm for the determination of such velocities has been introduced by Neidell, N. et al., "Semblance and Other Coherency Measures for Multichannel Data," Geophysics, 36, p 482-497, 1971. According to an embodiment, for each selected scatterer 208, a muting operation is performed in the time domain to isolate the remaining energy. Thus, method 500, following step 507, has used a combination of classical velocity analysis algorithms and semblance-like algorithms to determine the position and velocities of all N scatterers prior to entering the loop of method 500 that begins with step 508.

Following step 507, in step 508, scatterer selection and muting occurs. Scatterer selection is the process of selecting a first of a possible plurality of scatterers 208 to process. Muting is the process of assigning, to certain samples, a value of zero, so that they do not degrade the quality of desired reflections. Thus, muting involves determining an interval and assigning the value of zero to the samples during the muting interval. Typically, muted signals include first breaks and the refraction trains that follow them. According to an embodiment, muting occurs in surface waves not scattered by a selected scatterer.

In step 510 of method 500, with knowledge of the surface velocity $v_{SM}$, and the scatterer position, the arrival times of the scattered waves can be computed and windowed. Methods for determining arrival times of each of the scattered waves, and for windowing the determined arrival times are known to those of skill in the art. For example, according to an embodiment, if the scatterer position and the surface velocity are known, then the arrival time of the scatterer can be computed (t=x/V+y/V where x is the source-scatterer distance and y the scatterer-receiver distance) Then, a window size is determined in the time domain as w=[t−a t+b], wherein the variables a and b are time margins, determined in accordance with practices known to those of skill in the art, to ensure that the complete scattered wavelet is within the time-window. To better understand the results of such processing, FIG. 7A illustrates surface wave filtered data (step 506), and FIG. 7B illustrates that same data after the step of muting, determining of the arrival times, and windowing of the scattered waves has been performed (steps 508 and 510).

Figure 2B:
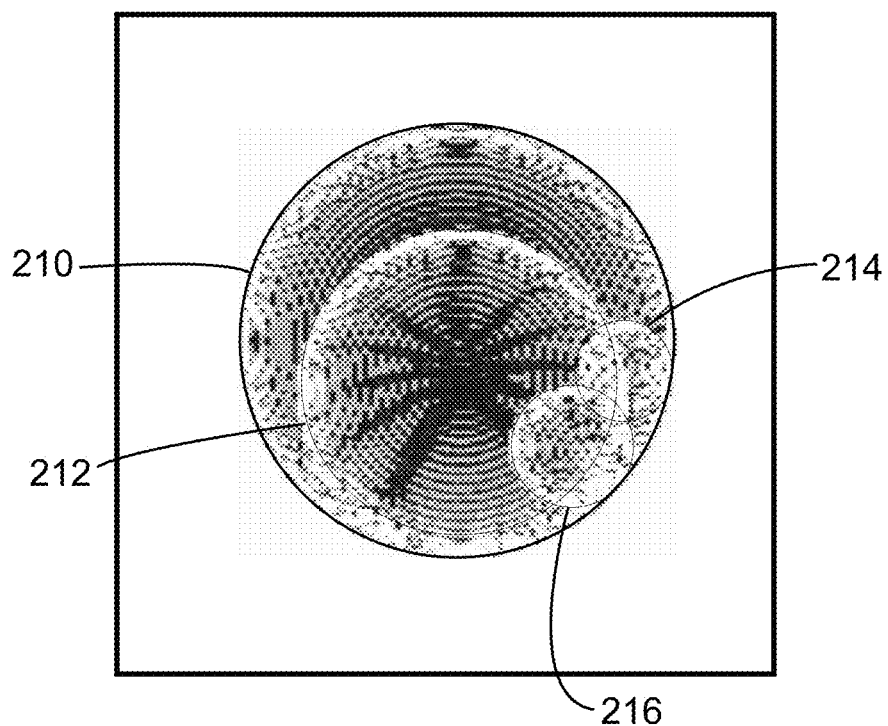
FIG. 2B illustrates a corresponding time-slice of the Full 3D source-receiver design when synthetic data is introduced to the receivers.

Method 500 then proceeds to step 512 wherein a scatter referential delay is determined for each trace. According to an embodiment, the step of determining or establishing the scatterer referential delay is the process of adding a delay for each trace with respect to the selected scatterer 208. That is, according to an embodiment, to better filter the scattered wave, a referential change, or specific change, is computed and applied for each trace with respect to the selected scatterer 208. This processing of each seismic trace is done in such a way that after applying this delay to each trace with respect to the selected scatterer 208, the shape of the waves scattered by the given scatterer within a time slice becomes circular at any time, as was shown in the Full 3D case (see, FIG. 2B). According to a further embodiment, this is generally true only for the scatterer 208 selected in step 508, but not for direct waves or any other but the selected scatterer 208. That is, each time a new scatterer 208 is iteratively selected in step 408 (the $M^{th}$ of N total scatterers), a new scatterer referential (described as a "scatterer referential delay $\tau_{RD}$," below) is calculated or determined.

Figure 9A:
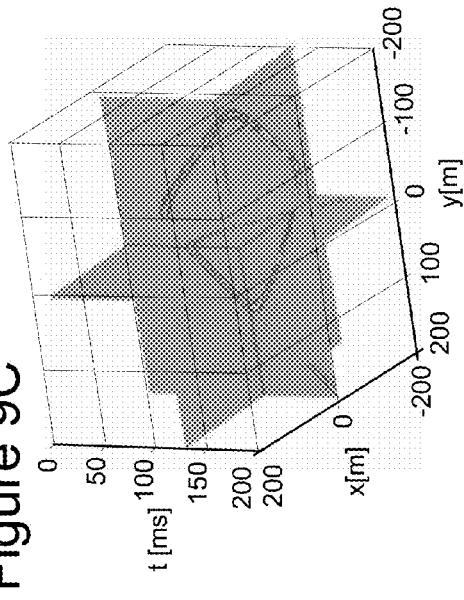
FIGS. 9A-9D illustrate first arrival scatterer patterns in the time domain for both the Full 3D case and the cross spread case (FIGS. 9A and 9C), and the fk domain for both the Full 3D case and the cross spread case (FIGS. 9B and 9D)
Figure 9B:
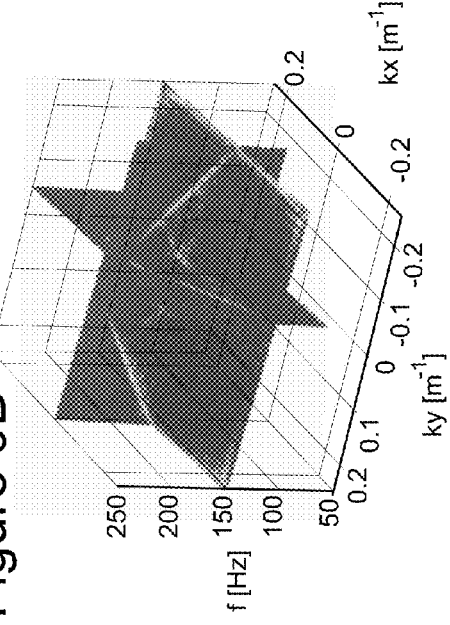

FIGS. 8A and 8B illustrate the parameters associated with adding the scatterer referential delay $\tau_{RD}$ to the traces associated with the given scatterer 208. In FIGS. 8A and 8B, two source-receiver pairs image the same scattering point 208 for both Full 3D and cross spread source receiver designs, respectively. Thus, in FIG. 8A, i.e., the Full 3D source receiver design, source 800 images scatterer 208 with receiver 2A. In FIG. 8B, i.e., the cross spread source receiver design, source 804 images scatterer 208 with receiver 2B. According to an embodiment, arrival-time correction is computed for all the source-receiver pairs. For a given scatterer 208 and the receiver 2A of the Full 3D design (FIG. 8A) the travel-time is the sum of (1) the travel time from the unique source 800 to the scatterer 208 and (2) the travel time from the scatterer 208 to the receiver 2A. It can be that, for a given scatterer, only the second quantity varies when the source-receiver pair varies (because there is only one source). The resultant pattern, therefore, depends only on the distance between the scatterer and receivers, and as a result the pattern is still circular at a given time (or conical if the global 3D cube is considered, as shown in FIG. 9A). Under those conditions, the pattern in the fk domain is also conical (see FIG. 9B), regardless of the scatterer position. According to an embodiment, therefore, the same fk filter will filter all the scattered waves.

Figure 9C:
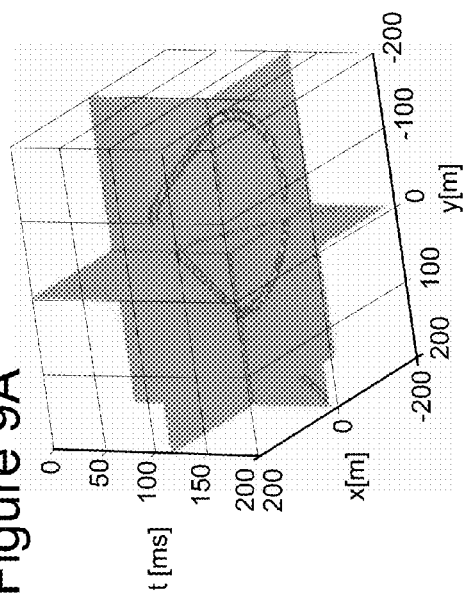
Figure 9D:
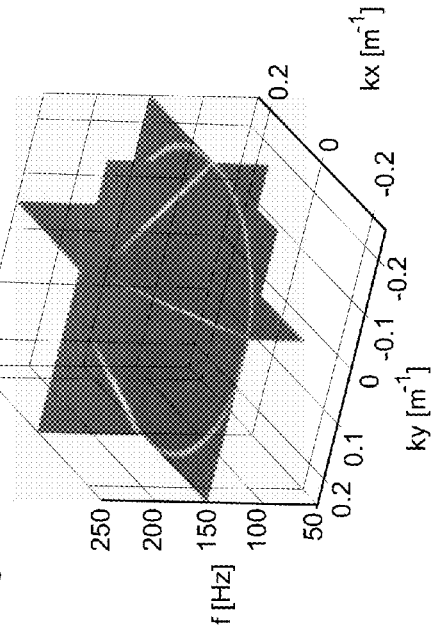

In case of cross spread design (FIG. 8B) the travel-time is the sum of (1) the travel-time from the source 804 to the scatterer 208 and (2) the travel-time from the scatterer 208 to the receiver 2B. For a given scatterer, the two quantities (1) and (2) will change because the source 804 and receiver 2B will change. According to an embodiment, therefore, the resulting source-scatterer-receiver travel time pattern at a fixed time is no longer circular, and the pattern is modified as shown in FIG. 9C. In the fk domain, where the filtering is performed, the pattern is also modified in a scatterer-dependent manner, so that the fk filtering efficiency decreases, as shown in FIG. 9D. It can further be appreciated that in FIG. 9D, the energy is distributed to the corners and center, and not so much on the cone. This illustrates the less-than optimal result of the cross-spread design in regards to an fk representation. FIGS. 8A and 8B also illustrate the various distances d travelled by the waves that are used in the scatterer referential delay calculation and discussed below.

Method 500 makes use of the velocity determined in step 510 to determine the scatterer referential delay, according to the equation velocity (v)=distance (d)/time (t). Data is first simulated as if it had been received using a Full 3D source-receiver pattern to determine the distances illustrated in FIG. 8A, such that the scatterer referential delay time can be calculated for a given scatterer 208 as:

$$\text{Scatterer Referential Delay, } \tau_{RD} = (d_{dr,2B} + d_{sd,2B} - d_{dr,2A} - d_{sd,2A})/v_{SM} \qquad \text{Eq. (1),}$$

wherein, as shown in FIGS. 8A and 8B, $d_{dr,2B}$ is the distance from the selected scatterer 208 (chosen in step 508) to a first selected receiver 2B, $d_{sd,2B}$ is the distance from the scatterer 208 to a first selected source 804, $d_{dr,2A}$ is the distance from the same scatter 208 to a second selected receiver 2A (from the Full 3D source-receiver design simulation), and $d_{sd,2A}$ is the distance from the same scatterer 208 to a second selected source 800, also from the Full 3D source-receiver design simulation. Note that although equation (1) provides one example of a scatterer referential time delay, those skilled in the art will appreciate that other equations or algorithms could be used to implement scatterer referential time delays according to other embodiments".

Thus, in step 512, and to summarize equation (1) above, by considering corresponding source-receiver pairs from a simulated Full 3D source-receiver pattern and the actual, recorded cross spread pattern, for a given scatterer 208, the difference in the combined distances from receiver to scatterer to source between the cross spread source-receiver design and the Full 3D source-receiver design provides the applied referential delay, $\tau_{RD}$, that will be applied to the cross spread source-receiver design trace in order to obtain a circular pattern of the scattered energy in slices of time. An example of the data after applying this referential delay can be seen in FIG. 7C. After step 512, the scattered energy of the selected scatterer 208 is arranged so that classical processing and/or filtering can be applied with substantially similar performance as in the Full 3D source-receiver design case.

Thus, following step 512, wherein the scatterer referential delay $\tau_{RD}$ is added to the applied traces, method 500 proceeds to step 514 wherein a second 3D fk filtering step occurs on the modified data to isolate the remaining waves scattered by the given scatterer 208 (selected in step 508); the resultant exemplary image can be seen in FIG. 7D. According to further embodiments, other filtering processes can be used (as is the case with step 506), and the same or different other type of filtering can occur in step 514. According to another embodiment, an example of a different filtering type is singular value decomposition (SVD) filtering.

The filtered data is then modified again, such that in step 516 the referential delay, $\tau_{RD}$ is subtracted from the trace data so that each trace returns to its original initial reference point. The data at this point represents the scattered waves related to the selected scatterer 208, and can be referred to as scatterer noise energy, so that in effect, the scatterer noise energy has been isolated from the wave energy. Step 518 follows step 516. Each time that step 518 is encountered, the scatterer noise energy (for the $M^{th}$ scatterer) is subtracted from the output of step 506, surface wave filtered data, to obtain substantially surface wave and scatterer energy-free land seismic data. FIG. 7E represents the output of step 516, for one scatterer, and as such is compared to the image shown in FIG. 7A, the output of step 506, as discussed above. According to an embodiment, adaptive filtering can be used to perform the subtraction of step 518. The output of step 518, substantially surface wave and scatterer energy-free land seismic data, is the data from which the next iteratively produced scatterer noise energy (determined in step 516) is subtracted from. FIG. 7F represents the output of method 500 after a second scatterer has been processed. For example, if there are five scatterers, the steps of 508-520 would be repeated five times, and each time the original data, surface wave filtered data, would be iteratively modified and improved when each of the five different scatterers are considered. Thus, a continuously improved image is created, wherein after each iteration, greater amounts of scatterer noise are eliminated.

In decision step 520, method 500 determines whether additional scatterers exist in the seismic data set, by inquiring as to whether M=N. If not (i.e., M is less than N, "No" path from decision step 520), method 500 returns to step 508 to select another scatterer set of energy data, and repeats steps 510 through 518 again. This process continues until all of the scatterers 208 have been considered and their respective "noise" energy has been processed (i.e., substantially or completely eliminated, according to an embodiment) by method 500 ("Yes" path from decision step 520; i.e., M=N). The result is a substantially surface wave and scatterer noise energy-free set of seismic data for the GAI. In step 522, additional processing takes place (as briefly described above in reference to FIG. 4), or land seismic data can be displayed.

According to further embodiments, instead of iteratively processing the scattered energy on the basis of "N" different scatterers, different velocities can be taken into account for a given scatterer as the basis of iteratively performing the steps of the method 500. For example, if the surface waves show "M" Rayleigh modes with different enough velocities, $v_s$, it can be useful to apply the steps of method 500 "M" times for the same scatterer (one for each different Rayleigh mode velocity). In this case, step 508, which selects different scatterers, would instead select one scatterer, and then select a first velocity in step 510. Then, decision step 520 would determine how many other different velocity bins exist (of the "M" different Rayleigh mode velocities), and determine whether more are left to process the scattered energy with respect to. According to an embodiment, the differences in velocities for separating can range from about 10% to about 30%, but can also be a different range according to different types of data received.

In still a further embodiment, subtraction step 518 can be preceded by a decision step (not shown in FIG. 5) such that the scattered energy is compared to a noise threshold, and unless the energy exceeds the threshold, then subtraction in step 518 does not take place. FIG. 10 illustrates trace energy for a given scatterer as a function of trace number prior to the step of subtraction in method 500 according to an embodiment. For example, FIG. 10 illustrates that for one scatterer 1000, the traces around trace number 40 show a high energy level and should be subtracted while traces after number 80 show only noise that modify the data content for which the subtraction of step 518 need not be performed. One purpose of such an additional decision step is to reduce the number of subtractions that need to occur in order to improve processing speed. Removing scattered energy that fails to meet a certain threshold amount may not make a substantial difference in the quality of the output seismic data and therefore its removal does not necessarily have to occur.

Still further according to an embodiment, the "referential change" applies for cross spread source-receiver designs. It can, however, be used with any other source-receiver design in order to obtain favorable patterns of the scattered waves for any type of filter.

In comparison with conventional, non-iterative 3D fk filtering, the method(s) disclosed herein removes a substantial part of the scattered energy. According to one example laboratory experiment, about 40 dB gain was achieved. As mentioned above, FIGS. 6A and 6B illustrate the received and processed data, respectively, using method 500 for filtering received data when using a cross spread source-receiver design for the acquisition of land based seismic data according to an embodiment. According to an embodiment, FIGS. 6A and 6B illustrates a common source gather example where method 500 has been applied using laboratory data in presence of 2 scatterers 208 for 121 receivers 2 and 81 sources 1.

Figure 11:
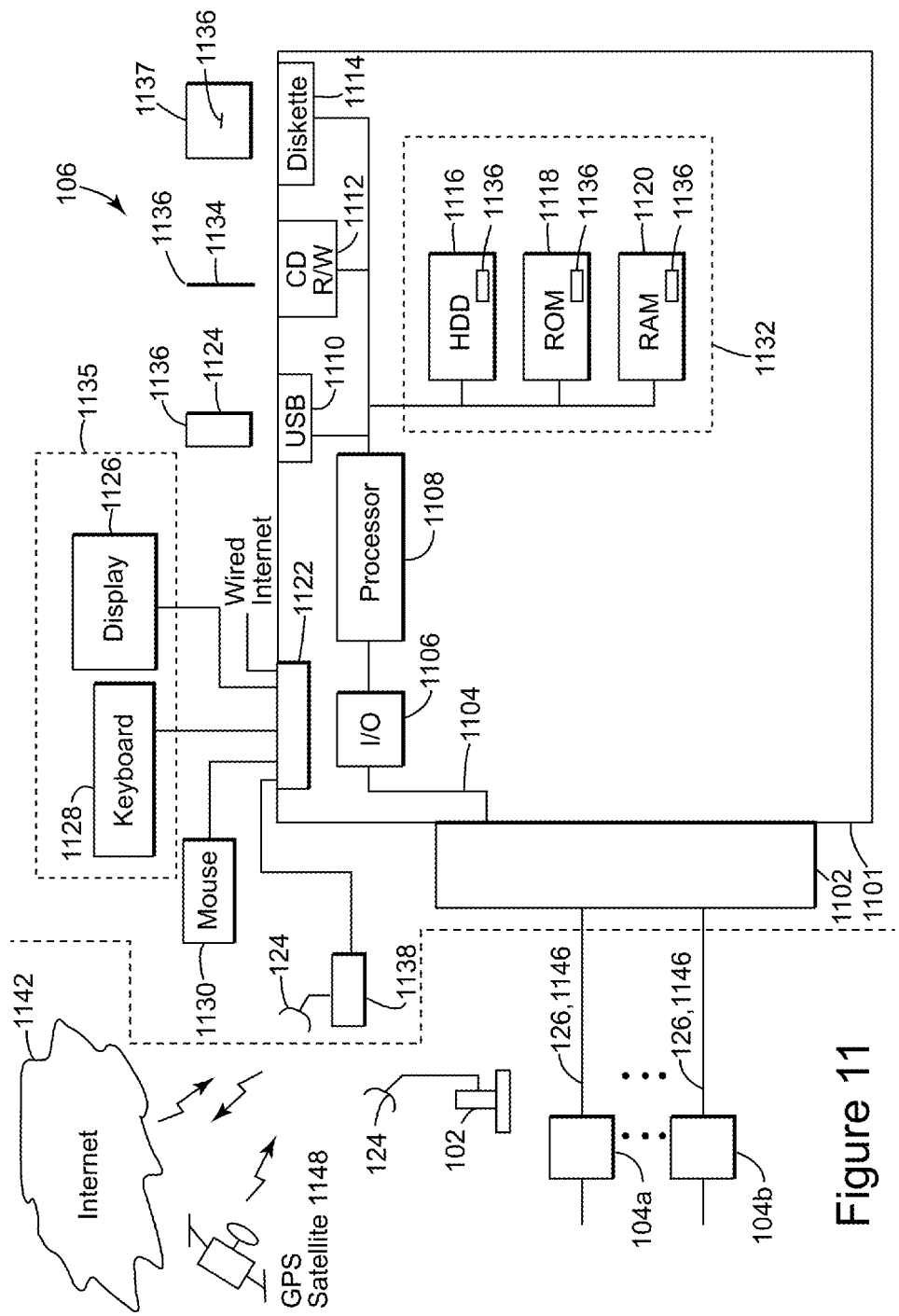
FIG. 11 illustrates a seismic data acquisition system suitable for use to implement a method for filtering received data when using a cross spread source-receiver design for the acquisition of land based seismic data according to an embodiment.

FIG. 11 illustrates a seismic data acquisition recorder system (recorder system) 106 suitable for use to implement a method for filtering received data when using a cross spread source-receiver design for the acquisition of land based seismic data according to an embodiment. Recorder system 106 includes, among other items, server 1101, source/receiver interface 1102, internal data/communications bus (bus) 1104, processor(s) 1108 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 1110, compact disk (CD)/digital video disk (DVD) read/write (R/W) drive 1112, floppy diskette drive 1114 (though less used currently, many servers still include this device), and data storage unit 1132. Data storage unit 1132 itself can comprise hard disk drive (HDD) 1116 (these can include conventional magnetic storage media, but, as is becoming increasingly more prevalent, can include flash drive-type mass storage devices 1124, among other types), ROM device(s) 1118 (these can include electrically erasable (EE) programmable ROM (EEPROM) devices, ultra-violet erasable PROM devices (UVPROMs), among other types), and random access memory (RAM) devices 1120. Usable with USB port 1110 is flash drive device 1124, and usable with CD/DVD R/W device 1112 are CD/DVD disks 1134 (which can be both read and write-able). Usable with diskette drive device 1114 are floppy diskettes 1137. Each of the memory storage devices, or the memory storage media (1116, 1118, 1120, 1124, 1134, and 1137, among other types), can contain parts or components, or in its entirety, executable software programming code (software) 1136 that can implement part or all of the portions of the method described herein. Further, processor 1108 itself can contain one or different types of memory storage devices (most probably, but not in a limiting manner, RAM memory storage media 1120) that can store all or some of the components of software 1136.

In addition to the above described components, system 106 also comprises user console 1135, which can include keyboard 1128, display 1126, and mouse 1130. All of these components are known to those of ordinary skill in the art, and this description includes all known and future variants of these types of devices. Display 1126 can be any type of known display or presentation screen, such as liquid crystal displays (LCDs), light emitting diode displays (LEDs), plasma displays, cathode ray tubes (CRTs), among others. User console 1135 can include one or more user interface mechanisms such as a mouse, keyboard, microphone, touch pad, touch screen, voice-recognition system, among other inter-active inter-communicative devices.

User console 1135, and its components if separately provided, interface with server 1101 via server input/output (I/O) interface 1122, which can be an RS232, Ethernet, USB or other type of communications port, or can include all or some of these, and further includes any other type of communications means, presently known or further developed. Recorder system 106 can further include communications satellite/global positioning system (GPS) transceiver device 1138 (to receive signals from GPS satellites 1148), to which is electrically connected at least one antenna 124 (according to an embodiment, there would be at least one GPS receive-only antenna 124, and at least one separate satellite bi-directional communications antenna 124). Recorder system 106 can access internet 1142, either through a hard wired connection, via I/O interface 1122 directly, or wirelessly via antenna 124, and transceiver 1138.

Server 1101 can be coupled to other computing devices, such as those that operate or control the equipment of recorder system 106, via one or more networks. Server 1101 may be part of a larger network configuration as in a global area network (GAN) (e.g., internet 1142), which ultimately allows connection to various landlines.

According to a further embodiment, recorder system 106, being ostensibly designed for use in seismic exploration, will interface with one or more sources 102 and one or more receivers 104. The receivers 104 are attached to cables 126 that are connected to recorder system 106. Sources 102 can communicate with recorder system 106, if necessary, via antenna 124. As further previously discussed, receivers 104 can communicate with server 1101 either through cable 126, or via a wireless system that can communicate via antennas 124 and transceiver 1138 (collectively described as communications conduit 1146). Because of the desired mobility of vehicle 122a, sources 102 communicate to recorder system 106 and server 1101 via antenna 124.

According to further embodiments, user console 1135 provides a means for personnel to enter commands and configuration into recorder system 106 (e.g., via a keyboard, buttons, switches, touch screen and/or joy stick). Display device 1126 can be used to show: visual representations of acquired data; source 102 and receiver 104 position and status information; survey information; and other information important to the seismic data acquisition process. Source and receiver interface unit 1102 can receive the land seismic data from receivers 104 though communication conduit 1148 (discussed above); the link is bi-directional so that commands can also be sent to receivers 104, and to sources 102 via antenna 124. Excitation signals, control signals, output signals and status information related to source 102 can be exchanged by antennas 124 between recorder system 106 and source 102.

Bus 1104 allows a data pathway for items such as: the transfer and storage of data that originate from either the source sensors or receivers; for processor 1108 to access stored data contained in data storage unit memory 1132; for processor 1108 to send information for visual display to display 1126; or for the user to send commands to system operating programs/software 1136 that might reside in either the processor 1108 or the source and receiver interface unit 1102.

Recorder system 106 can be used to implement method 500 for filtering received data when using a Cross Spread source-receiver design for the acquisition of land based seismic data according to an embodiment. Hardware, firmware, software or a combination thereof may be used to perform the various steps and operations described herein. According to an embodiment, software 1136 for carrying out the above discussed steps can be stored and distributed on multi-media storage devices such as devices 1116, 1118, 1120, 1124, 1134, and/or 1137 (described above) or other form of media capable of portably storing information (e.g., universal serial bus (USB) flash drive 1126). These storage media may be inserted into, and read by, devices such as the CD-ROM drive 1112, the disk drive 1114, 1116, among other types of software storage devices.

As also will be appreciated by one skilled in the art, the various functional aspects of the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a source array, computer software, and a method for filtering received data when using a Cross Spread source-receiver design for the acquisition of land based seismic data according to an embodiment. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of the embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

We claim:

1. A method for filtering scatterer noise energy from land seismic waves in a cross-spread source-receiver pattern, the method comprising:
    recording waves received at receivers disposed relative to a shot pattern in a cross-spread source receiver pattern;
    filtering surface waves from the recorded waves to produce surface wave filtered data;
    determining a plurality of scatterers associated with the recorded waves;
    selecting a scatterer from the plurality of scatterers;
    isolating scatterer noise energy generated by the scatterer by filtering the surface wave filtered data using a scatterer referential time delay associated with the scatterer, wherein the scatterer referential time delay is calculated as $T_{RD} = (d_{dr,2B} + d_{sd,2B} - d_{dr,2A} - d_{sd,2A})/v_{SM}$, wherein $d_{dr,B}$ is a first distance from said selected scatterer to a first selected receiver,
    $d_{sd,B}$ is a second distance from said selected scatterer to a first selected source,
    $d_{dr,A}$ is a third distance from said selected scatter to a second selected receiver, and
    $d_{sd,A}$ is a fourth distance from said selected scatterer to a second selected source;
    subtracting said scatterer noise energy from said surface wave filtered data; and
    repeating each of the steps of selecting, isolating and subtracting for each of the plurality of scatterers.

2. The method according to claim 1, further comprising:
    transmitting seismic signals from one or more sources using a cross spread source-receiver design; and
    receiving said transmitted signals at one or more receivers.

3. A method for filtering scatterer noise energy from land seismic waves, the method comprising:
    filtering surface waves from acquired land seismic data to produce surface wave filtered data;
    selecting a scatterer from a plurality of scatterers;
    isolating scatterer noise energy from the scatterer based on a filtering in a scatterer referential time delay;
    subtracting scatterer noise energy from said surface wave filtered; and
    repeating each of the steps of selecting, isolating and subtracting for each of the plurality of scatterers.

4. The method according to claim 3, wherein said step of filtering comprises:
    filtering said surface waves using one of a 3D fk filtering method and a singular value decomposition filtering method.

5. The method according to claim 3, wherein said step of selecting further comprises:
    muting said surface waves not scattered by said selected scatterer.

6. The method according to claim 3, wherein said step of isolating scatterer noise energy from the first scatterer comprises:
    determining a position of said selected scatterer;
    determining a surface mean velocity applicable to said selected scatterer;
    determining a scattered waves arrival-time for said selected scatterer;
    windowing scattered waves for said selected scatterer;
    determining, for each trace, a scatterer referential delay for said selected scatterer;
    adding said scatterer referential delay to each of said traces associated with said selected scatterer to obtain applied scatterer referential data;
    performing filtering on said applied scatterer referential data; and
    subtracting said scatter scatterer referential delay from said filtered applied scatterer referential data to isolate said scatterer noise energy from the first scatterer.

7. The method according to claim 6, wherein said step of determining said position of said selected scatterer comprises:
    using at least one semblance algorithm to determine said position of said selected scatterer.

8. The method according to claim 6, wherein the step of determining said scatterer referential delay comprises evaluating the following expression—

Scatterer Referential Delay, $\tau_{RD} = (d_{dr,B} + d_{sd,B} - d_{dr,A} - d_{sd,A})/v_{SM}$, wherein $d_{dr,B}$ is a first distance from said selected scatterer to a first selected receiver,
    $d_{sd,B}$ is a second distance from said selected scatterer to a first selected source,
    $d_{dr,A}$ is a third distance from said selected scatter to a second selected receiver, and
    $d_{sd,A}$ is a fourth distance from said selected scatterer to a second selected source.

9. The method according to claim 6, wherein the step of adding said scatterer referential delay creates substantially circular shaped wave data.

10. The method according to claim 6, wherein the step of performing filtering on said applied scatterer referential data comprises:
    using one of a Full 3D fk filtering method and a singular value decomposition filtering method on said applied scatterer referential data.

11. The method according to claim 3, further comprising:
    determining a plurality of different surface velocities for a first selected scatterer, and iteratively determining said scatterer noise energy based on each of said plurality of different surface velocities.

12. The method according to claim 11, wherein the different surface velocities comprise a Rayleigh mode distribution of said surface velocities.

13. The method according to claim 3, further comprising:
determining whether said scatterer noise energy exceeds a first noise threshold, and performing said subtraction only if said scatterer noise energy exceeds the first noise threshold.

14. The method according to claim 3, further comprising:
transmitting seismic signals from one or more sources using a cross spread source-receiver design; and
receiving said transmitted signals at one or more receivers.

15. A method for filtering scatterer noise energy from seismic data, the method comprising:
selecting a scatterer from a plurality of scatterers;
determining scatterer noise energy generated by the scatterer in seismic data;
subtracting said scatterer noise energy from the seismic data;
filtering the seismic data prior to selecting, determining and subtracting;
determining a scatterer delay associated with the selected scatterer;
adding the scatterer delay to the seismic data; and
re-filtering the seismic data to subtract the scatterer noise energy from the seismic data.

16. The method of claim 15, wherein the step of subtracting further comprises:
subtracting the scatterer noise energy for a given trace from the seismic data if the scatterer noise energy for that trace exceeds a threshold.

17. The method of claim 15, wherein the seismic data is generated using a seismic acquisition system having a cross spread source-receiver pattern.

18. The method according to claim 15, further comprising:
transmitting seismic signals from one or more sources using a cross spread source-receiver design; and
receiving said transmitted signals at one or more receivers.

* * * * *